(12) United States Patent
Hsueh et al.

(10) Patent No.: US 8,422,347 B2
(45) Date of Patent: Apr. 16, 2013

(54) METHOD FOR DETERMINING PHASE DIFFERENCE OF TRACKING ERROR SIGNAL IN OPTICAL DISC DRIVE

(75) Inventors: Ming-Hua Hsueh, Taoyuan County (TW); Yi-Long Hsiao, Taoyuan County (TW)

(73) Assignee: Quanta Storage Inc., Taoyuan County (TW)

( * ) Notice: Subject to any disclaimer, the term of this patent is extended or adjusted under 35 U.S.C. 154(b) by 0 days.

(21) Appl. No.: 13/412,657

(22) Filed: Mar. 6, 2012

(65) Prior Publication Data

US 2012/0263027 A1    Oct. 18, 2012

(30) Foreign Application Priority Data

Apr. 12, 2011    (TW) .............................. 100112741 A

(51) Int. Cl.
*G11B 7/00*    (2006.01)

(52) U.S. Cl.
USPC ................... 369/53.23; 369/53.34; 369/47.28

(58) Field of Classification Search ............... 369/47.28, 369/59.2, 53.23, 53.28, 124.14, 53.34
See application file for complete search history.

(56) References Cited

U.S. PATENT DOCUMENTS

| | | | |
|---|---|---|---|
| 6,345,024 B2* | 2/2002 | Sugasawa et al. | 369/53.2 |
| 7,349,299 B2* | 3/2008 | Huang | 369/44.37 |
| 7,746,734 B2* | 6/2010 | Umeda et al. | 369/44.28 |
| 2002/0018411 A1* | 2/2002 | Kumagai | 369/47.17 |
| 2002/0021632 A1* | 2/2002 | Park | 369/44.28 |
| 2004/0202070 A1* | 10/2004 | Park et al. | 369/44.37 |
| 2004/0246834 A1* | 12/2004 | Seong | 369/44.37 |
| 2005/0025002 A1* | 2/2005 | Saito et al. | 369/44.37 |
| 2005/0174907 A1* | 8/2005 | Huang | 369/53.2 |
| 2007/0030788 A1* | 2/2007 | Nakamori et al. | 369/112.06 |

* cited by examiner

*Primary Examiner* — Thomas Alunkal
(74) *Attorney, Agent, or Firm* — Rabin & Berdo, P.C.

(57) ABSTRACT

A method for determining a phase difference of a tracking error signal is provided. The method includes: predetermining a plurality of phase differences, measuring MPP and SPP signals, establishing a phase difference curve by use of an amplitude ratio between (MPP+SPP) and (MPP−SPP), measuring MPP and SPP signals for a tracking error signal under test, calculating the amplitude ratio (MPP+SPP)/(MPP−SPP), and comparing with the phase difference curve to promptly determine the phase difference.

7 Claims, 5 Drawing Sheets

| phase difference | (MPP+SPP)/2 | (MPP−SPP)/2 | (MPP+SPP)/(MPP−SPP) |
|---|---|---|---|
| 0 degree | 100.0 | 0.0 | ∞ |
| 30 degree | 96.2 | 25.8 | 373 % |
| 60 degree | 86.6 | 50.0 | 173 % |
| 90 degree | 70.4 | 70.4 | 100 % |
| 120 degree | 50.0 | 86.6 | 58 % |
| 150 degree | 25.8 | 96.2 | 27 % |
| 180 degree | 0.0 | 100.0 | 0 % |

METHOD FOR DETERMINING PHASE DIFFERENCE OF TRACKING ERROR SIGNAL IN OPTICAL DISC DRIVE

This application claims the benefit of Taiwan application Serial No. 100112741, filed Apr. 12, 2011, the subject matter of which is incorporated herein by reference.

BACKGROUND OF THE INVENTION

1. Field of the Invention

The invention relates in general to a control method of an optical disc drive, and more particularly to a method for determining a phase difference that causes a tracking error displacement in track control of an optical disc drive.

2. Description of the Related Art

By focusing projected beam spots to an optical disc, an optical disc drive forms control signals of focusing error signal and tracking error signal through differences in the amounts of reflected light beams. With the control signals, the optical disc drive keeps the beam spots remain focused at the optical disc and move along data tracks to read data from/write data to the optical disc.

FIG. 1 shows a functional block diagram of an optical disc drive generating a tracking error; FIG. 2 shows a schematic diagram of a tracking error. When the conventional optical disc drive performs track control via differential push-pull (DPP), a pickup head focuses laser beams to a main light beam 1a and two secondary light beams 1b and 1c, which are respectively projected to a data groove 2 and two lands 3. The projected light beams are reflected by an optical disc into reflected beam spots 4a, 4b and 4c, which are then respectively projected to a main optical transducer 5a and two secondary optical transducers 5b and 5c. The optical transducers 5a, 5b and 5c are respectively divided into two same-sized sub-units E and F, and convert light flux at the reflected beam spots 4a, 4b and 4c into corresponding electric signals. The electric signal E1−F1 of two sub-units of the main optical transducer 5a forms a main push-pull (MPP) signal. The electric signals [(E2−F2)+(E3−F3)] of the two sub-units of the two secondary transducers 5b and 5c are adjusted by a gain to a size substantially the same as the MPP signal to form a secondary push-pull (SPP) signal. The SPP signal is subtracted from the MPP signal (MPP−SPP) to form the tracking error signal, which serves as a control signal for the tracking of the optical disc drive.

An optimal projection angle θ between the main and secondary beams projected from the pickup head and the data groove is generally designed to render a 180-degree phase difference between the MPP signal and the SPP signal, so that the tracking error signal formed by (MPP−SPP) is given a maximum value to obtain an ideal tracking error signal that facilitates the control of the main beam 1a along of data groove 2, thereby correctly reading marks in the data groove 2. However, due to factors such as poor manufacturing, unsatisfactory quality, eccentric optical discs and relative oppositions of optical discs, an angle between the main and secondary beams and the data groove 2 may not be the predetermined optimal angle θ, such that a phase difference between the MPP signal and the SPP signal is not the predetermined phase difference either. As indicated by a dotted line in FIG. 2, the tracking error signal formed by (MPP−SPP) is attenuated as a result. To overcome the issue of phase difference, a phase difference detection circuit is proposed by the prior art for detecting the phase difference. However, the phase difference detection circuit increases circuit complexity and manufacturing costs.

Therefore, there is a need for an improved solution for determining the phase difference of a tracking error signal to obviate the abovementioned problems associated with the prior art.

SUMMARY OF THE INVENTION

It is an object of the present invention to provide a method for determining a phase difference of a tracking error signal. Original MPP and SPP signals for a tracking error signal with a plurality of predetermined phase differences are measured to calculate amplitude ratios between (MPP+SPP) and (MPP−SPP), so as to establish a phase difference curve.

It is another object of the present invention to provide a method for determining a phase difference of a tracking error signal. By directly measuring MPP and SPP signals of a tracking error signal and simply calculating ratios between (MPP+SPP) and (MPP−SPP), a phase difference curve is obtained to promptly determine the phase difference without requiring complicated calculation or detection.

To achieve the above objects, in the method for determining a phase difference of a tracking error signal, original MPP and SPP signals for a tracking error signal are measured by use of a plurality of predetermined phase differences, and amplitude ratios between (MPP+SPP) and (MPP−SPP) are calculated. A phase difference amplitude ratio table or a phase difference curve is established according to the predetermined phase differences and the corresponding amplitude ratios (MPP+SPP)/(MPP−SPP). For a tracking error signal to be tested for phase difference, MPP and SPP signals are measured to calculate the amplitude ratio between the (MPP+SPP) and (MPP−SPP) signals of tracking error signal under test, and the phase difference of the tracking error signal is promptly determined according to the established phase difference amplitude ratio table or phase difference curve.

The above and other aspects of the invention will become better understood with regard to the following detailed description of the preferred but non-limiting embodiments. The following description is made with reference to the accompanying drawings.

DETAILED DESCRIPTION OF THE INVENTION

FIGS. 3 to 6 show measuring a tracking error signal with predetermined phase differences of the present invention. The SPP signal below is amplified by a gain to a size substantially the same as that of the MPP signal. In the present invention, the tracking error signal generated by differential push-pull of the optical disc drive is adjusted to predetermined phase differences, e.g., 0 degree, 30 degrees, 60 degrees and 90 degrees, and signals MPP, SPP, (MPP−SPP)/2 and (MPP+SPP)/2 are respectively measured. The (MPP−SPP) signal generally serves as a tracking error signal for controlling the tracking of the optical disc drive. It should be noted that the signals (MPP−SPP) and (MPP+SPP) are reduced to a half to illustrate measuring and ratio adjustment in the description but are not to be construed as limiting the present invention.

Figure 1:
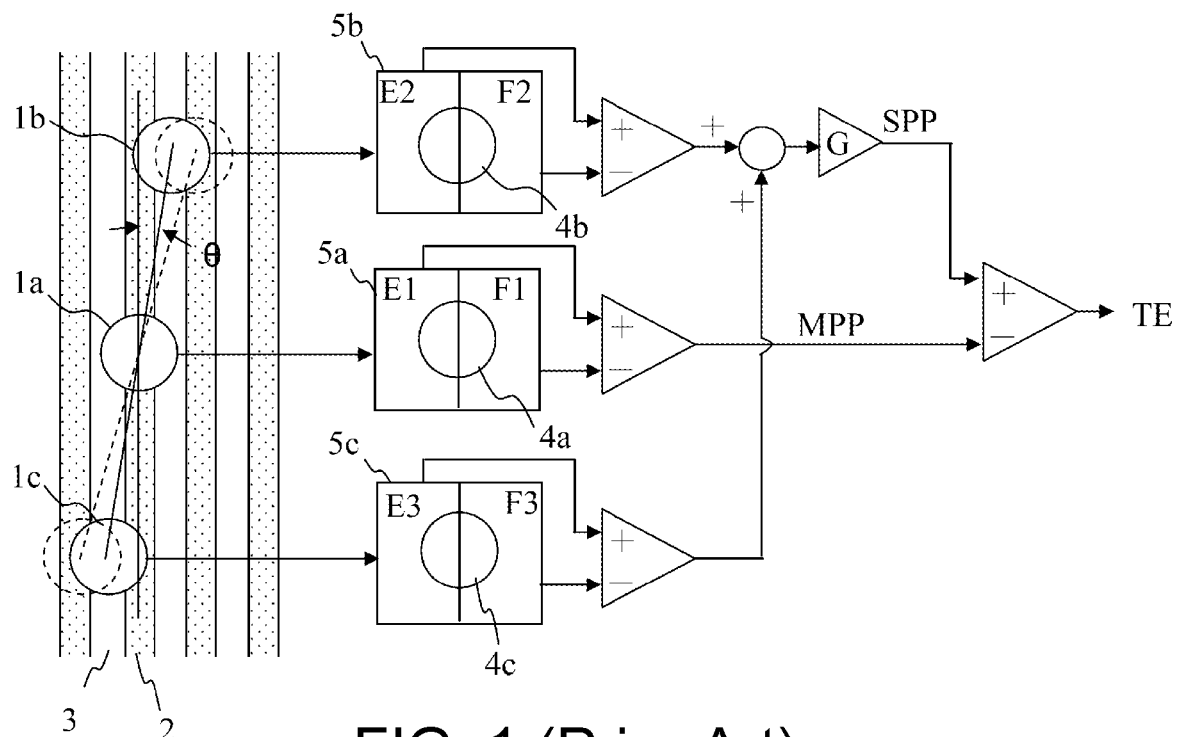
FIG. 1 is a functional block diagram of a conventional optical disc drive generating a tracking error signal.
Figure 2:
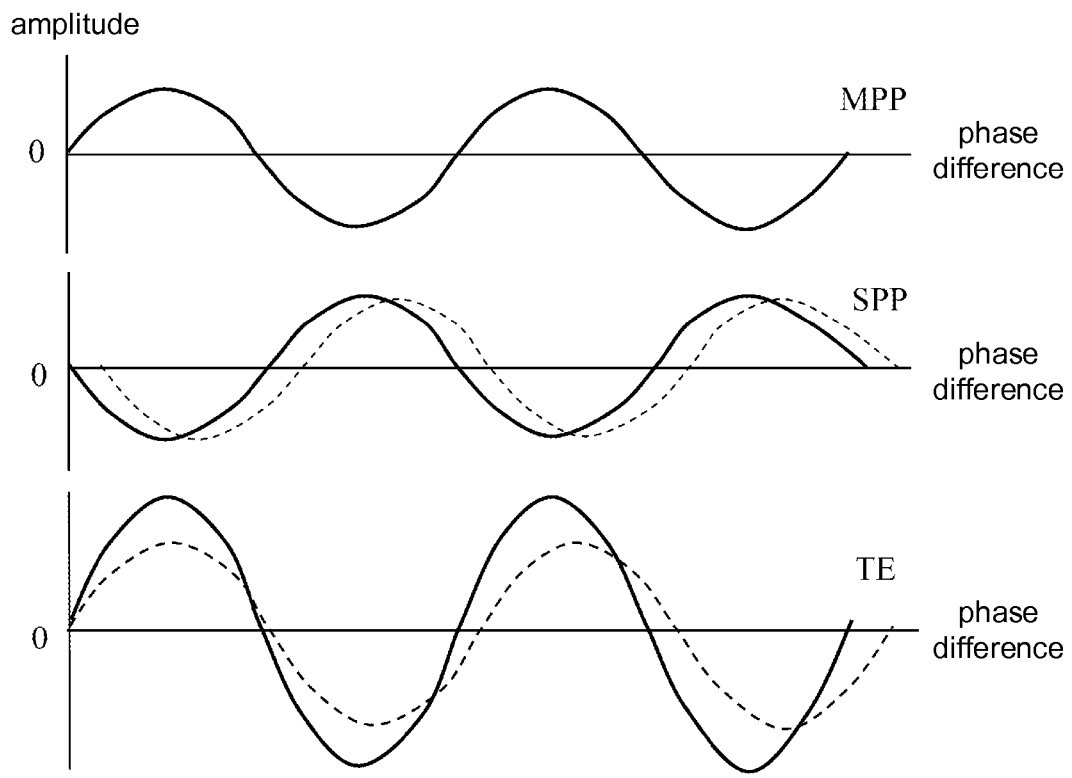
FIG. 2 is a schematic diagram of a tracking error signal in the prior art.
Figure 3:
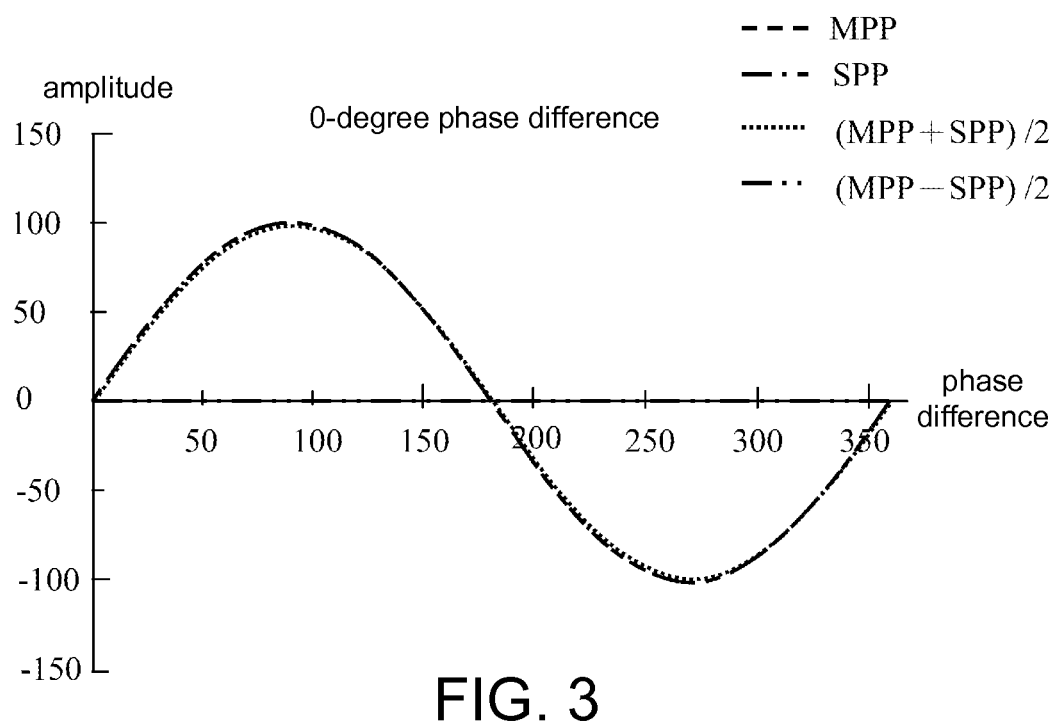
FIG. 3 is a schematic diagram of measuring a tracking signal with a 0-degree phase difference of the present invention.
Figure 4:
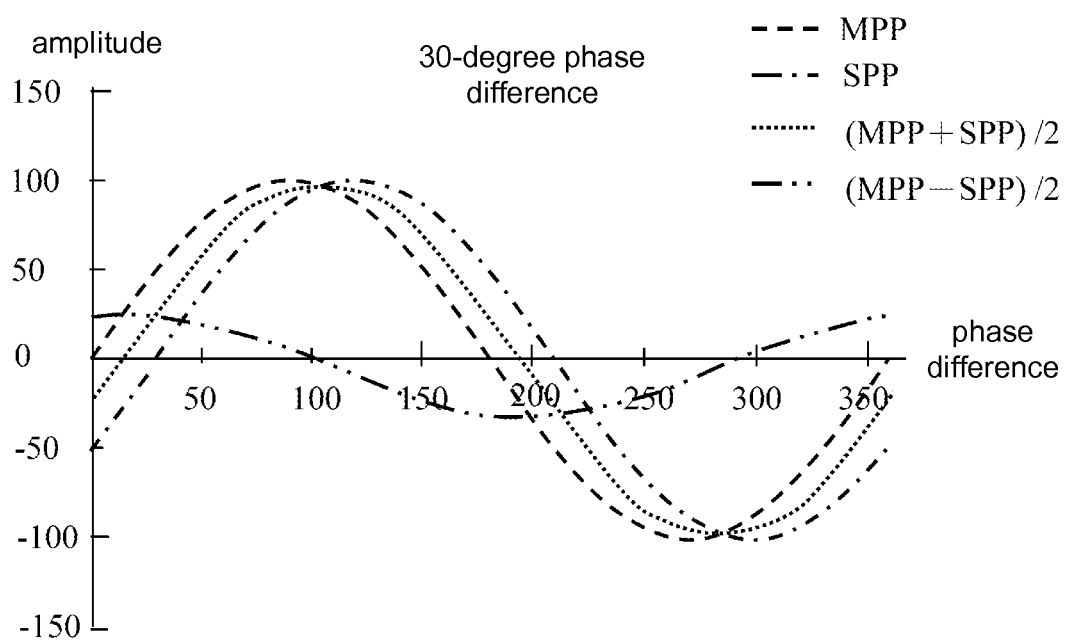
FIG. 4 is a schematic diagram of measuring a tracking signal with a 30-degree phase difference of the present invention.
Figure 5:
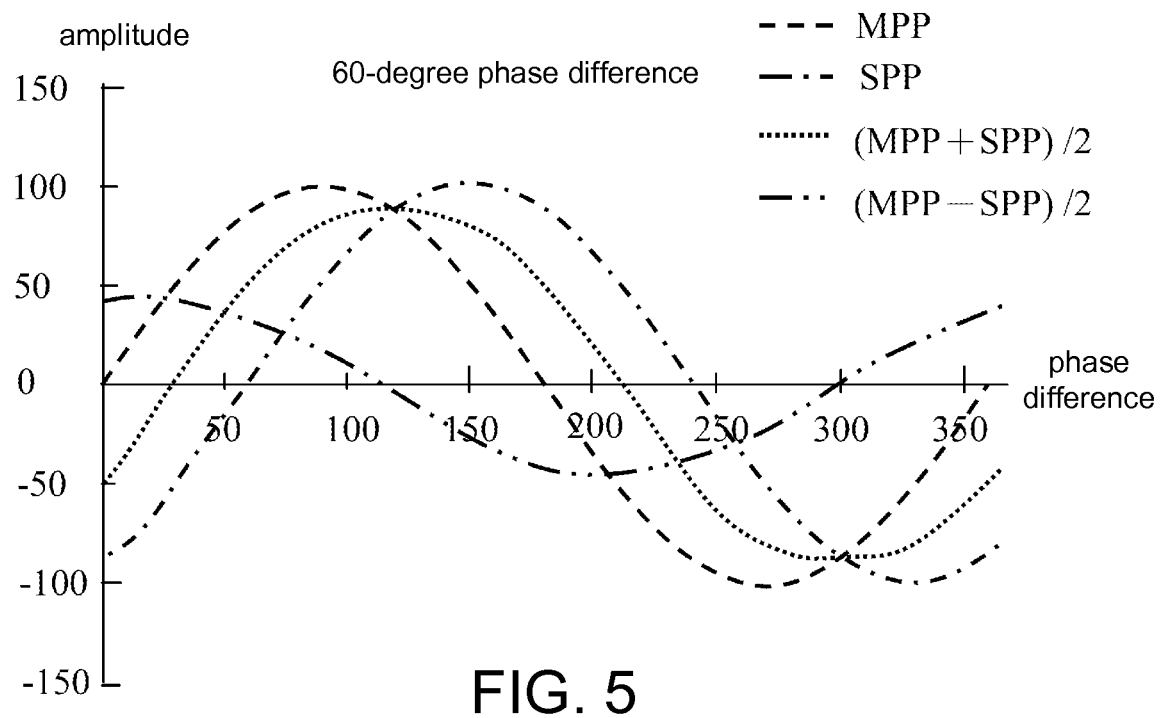
FIG. 5 is a schematic diagram of measuring a tracking signal with a 60-degree phase difference of the present invention.
Figure 6:
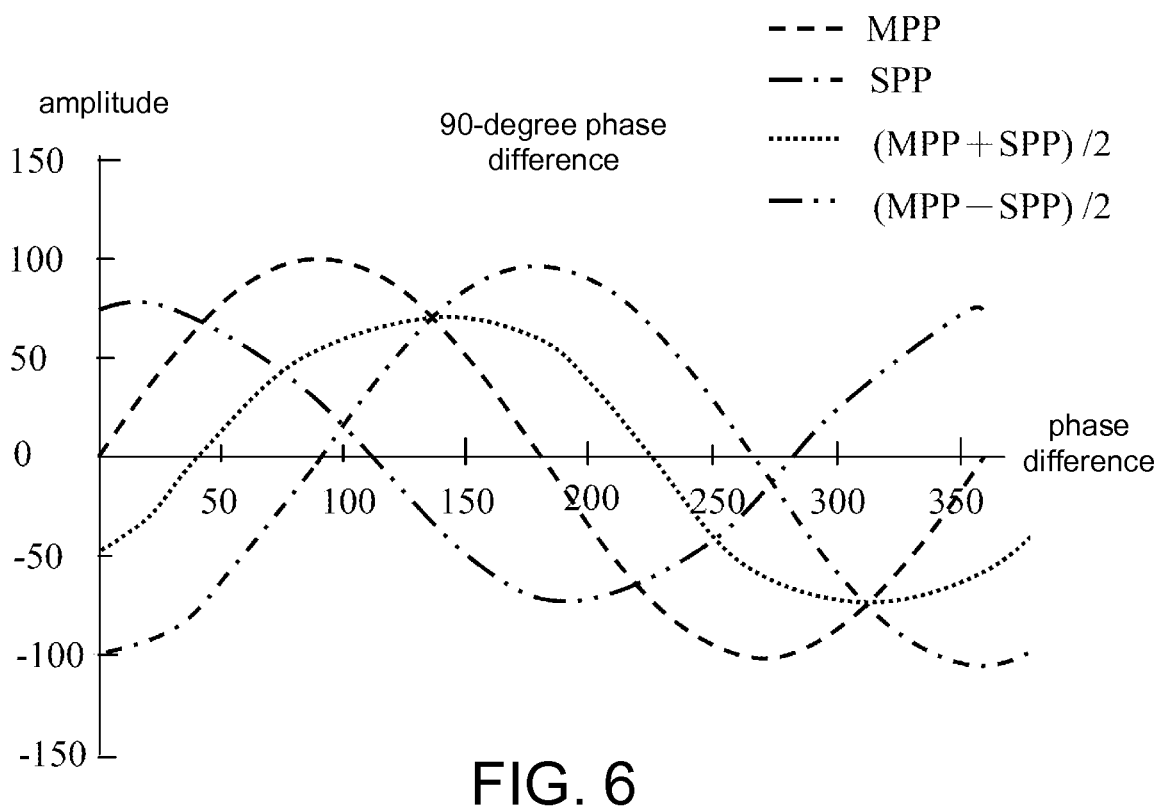
FIG. 6 is a schematic diagram of measuring a tracking signal with a 90-degree phase difference of the present invention.

Referring to FIG. 3, when the phase difference between the MPP and SPP signals is 0 degree, the MPP, SPP and (MPP+SPP)/2 signals are overlapped, the (MPP+SPP)/2 signal has a largest amplitude, and the (MPP−SPP)/2 signal overlaps with an axis of 0 amplitude to indicate that its amplitude is 0. When the phase difference between the MPP and SPP signals is respectively 30 degrees, 60 degrees and 90 degrees, it is observed that the amplitude of the (MPP+SPP)/2 signal reduces from 100 to 70.4, while the amplitude of the (MPP−SPP)/2 signal increases from 0 to 70.4. More specifically, among the different phase differences between the MPP and SPP signals, the amplitude of the (MPP+SPP)/2 signal and the amplitude of the (MPP−SPP)/2 signal is a relationship in a predetermined ratio.

Figures 7, 8:
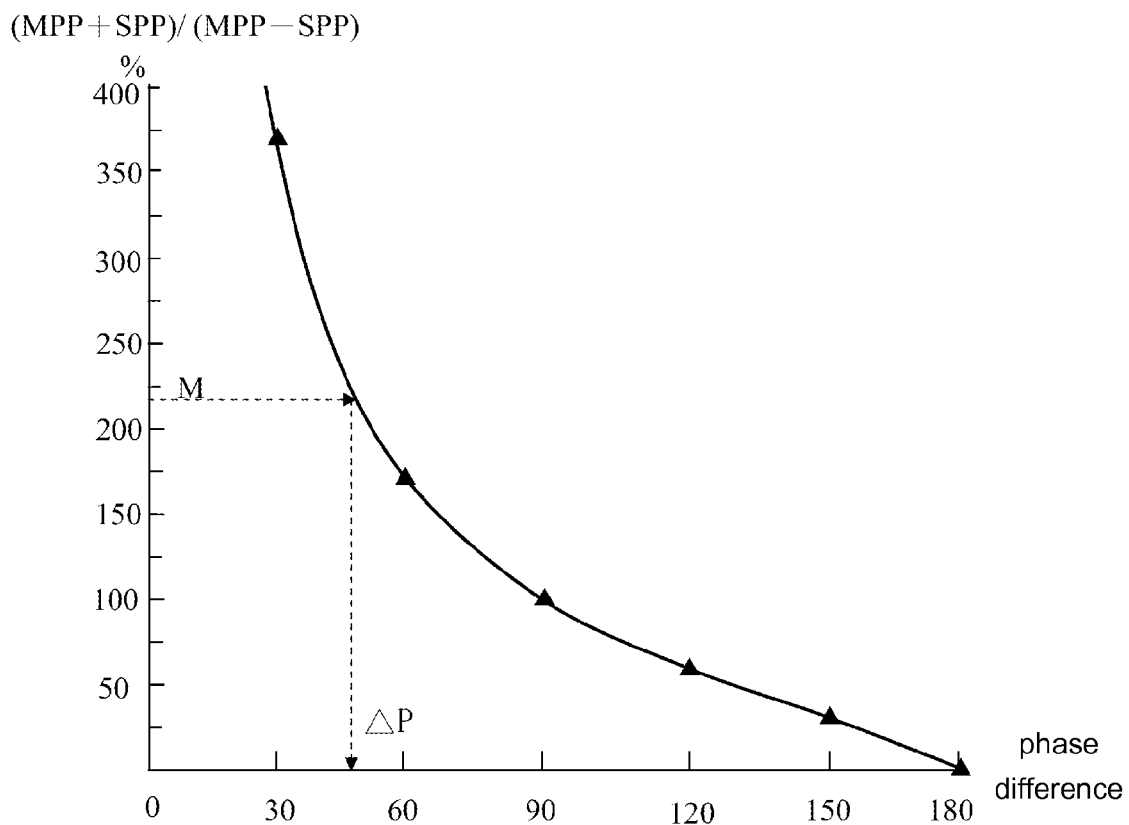
FIG. 7 is an amplitude ratio table of phase differences of the present invention.
FIG. 8 is an adapted phase difference curve of the present invention.

Within the range of 0 degree to 180 degrees of phase difference between the MPP and SPP signals, e.g., a plurality of predetermined readily adjustable phase differences of 0 degree, 30 degrees, 60 degrees, 90 degrees, 120 degrees, 150 degrees and 180 degrees, an ratio between the amplitude of the (MPP+SPP)/2 signal and the amplitude of the (MPP−SPP)/2 signal is calculated, and is represented in percentage as listed in a phase difference amplitude ratio table in FIG. 7. It is observed that, within the phase difference range of 0 degree to 180 degrees, each of the phase differences has a specific amplitude ratio (MPP+SPP)/(MPP−SPP). As the phase difference exceeds 180 degrees to reach 360 degrees, the amplitude ratio (MPP+SPP)/(MPP−SPP) repeats, in a way that the corresponding (MPP+SPP) signal and the (MPP−SPP) signal has an opposite positive/negative sign from those between 0 degree to 180 degrees.

Therefore, by use of the amplitude ratio table of phase difference in FIG. 7, the amplitude ratio of a plurality of predetermined differential pairs (MPP+SPP)/(MPP−SPP) are measured to adapt to a phase difference curve shown in FIG. 8. When the phase difference of a desired tracking error signal of an optical disc drive is to be determined, the original MPP and SPP signals of the optical disc drive are first measured while measuring the tracking error signal. An amplitude ratio M of the tracking error signal may be obtained through simple calculations of (MPP+SPP)/(MPP−SPP), and a phase difference ΔP of the tracking error signal can be determined by use of the phase difference amplitude ratio table or phase difference curve to perform compensation on the tracking error signal.

Figure 9:
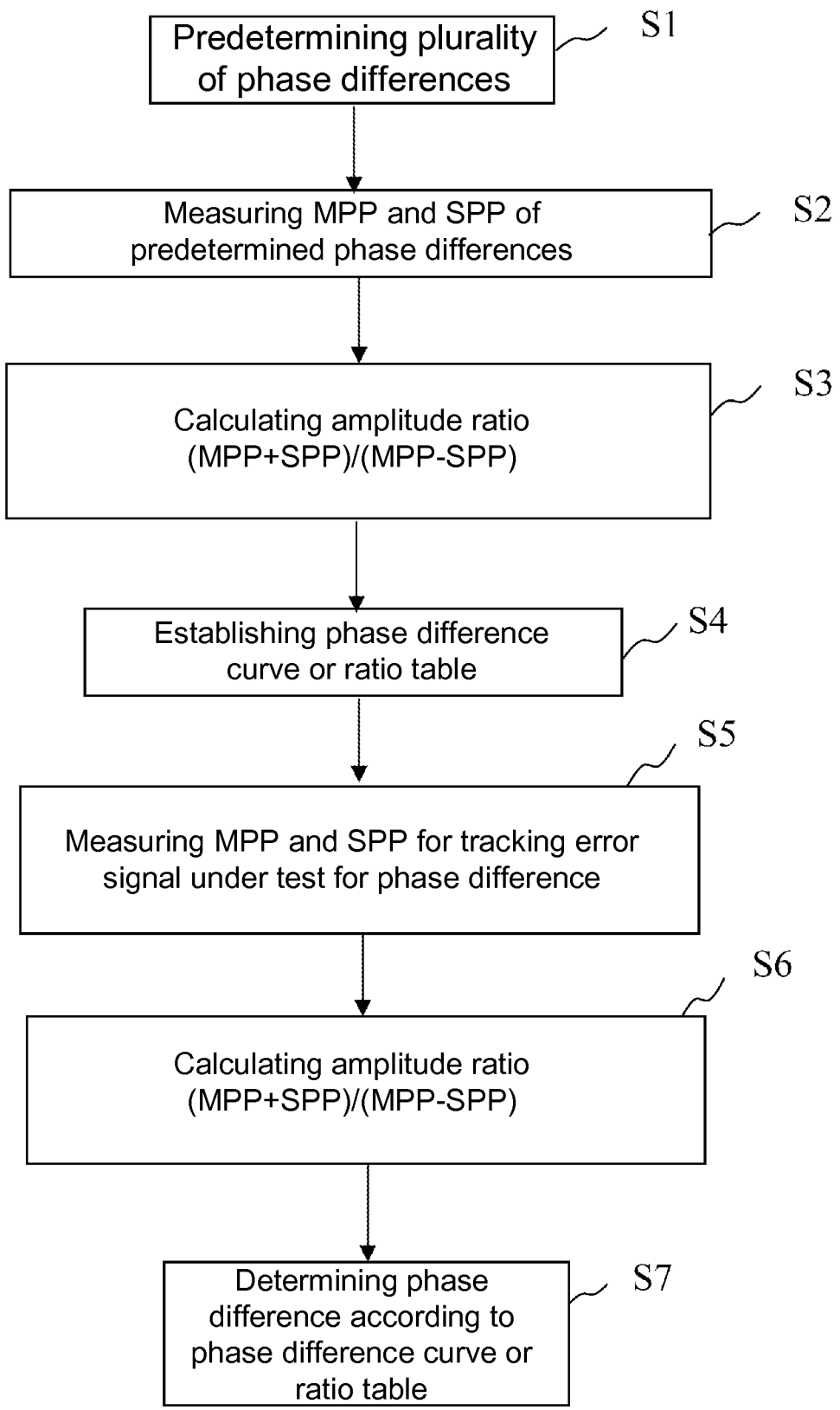
FIG. 9 is a flowchart of a method for determining a phase difference of a tracking error signal of the present invention.

FIG. 9 shows a flowchart of a method for determining a phase difference of a tracking error signal. Steps for establishing a phase difference curve and determining a phase difference shall be described in detail below. Step S1 comprises predetermining a plurality of phase differences between an MPP signal and an SPP signal, with the phase difference ranging within two ranges of 0 degree to 180 degrees or 181 degrees to 360 degrees. Step S2 comprises measuring the MPP and SPP signals for the tracking error signal with the predetermine phase differences. Step S3 comprises calculating a ratio between the amplitude of an (MPP+SPP) signal and the amplitude of an (MPP−SPP) signal. Step S4 comprises rendering an adapted phase difference curve corresponding to the amplitude ratio (MPP+SPP)/(MPP−SPP) by use of the plurality of predetermined phase differences and the corresponding amplitude ratios (MPP+SPP)/(MPP−SPP) to establish a phase difference curve of the tracking error signal of an optical disc drive. Step S5 comprises measuring MPP and SPP signals for a tracking error signal under test for phase difference. Step S6 comprises calculating an amplitude ratio (MPP+SPP)/(MPP−SPP). Step S7 comprises comparing and determining the phase difference of the tracking error signal according to the amplitude ratio (MPP+SPP)/(MPP−SPP) and the established phase difference curve.

Therefore, in the method for determining a phase difference of a tracking error signal of the present invention, original MPP and SPP signals for a tracking error signal are measured by use of a plurality of predetermined phase differences, and amplitude ratios between (MPP+SPP) and (MPP−SPP) are calculated to first establish a phase difference curve of a tracking error signal of an optical disc drive. For a tracking error signal to be tested for phase difference in an optical disc drive, MPP and SPP signals are measured to calculate the amplitude ratio between the (MPP+SPP) and (MPP−SPP) signals, and the phase difference of the tracking error signal is promptly determined according to the phase difference curve. Further, in the abovementioned embodiment, the measured amplitude ratio table of phase differences is adapted to a phase difference curve for determining the phase difference of the tracking error signal as an example. Alternatively, the data in the amplitude ratio table of phase differential pairs (MPP+SPP)/(MPP−SPP) may also be listed in a look-up table, or the phase difference may be obtained through interpolation or extrapolation.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for determining a phase difference of a tracking error signal in an optical disc drive, wherein the tracking error signal is formed by the optical disc drive to maintain beam spots focused at an optical disc and to move along data tracks, the method comprising:
   predetermined a plurality of phase differences for the tracking error signal;
   measuring a main push-pull (MPP) signal and a secondary push-pull (SPP) signal of the predetermined phase differences, respectively, wherein the main push-pull (MPP) signal is formed by a main optical transducer of the optical disc drive and the secondary push-pull (SPP) signal is formed by two secondary transducers of the optical disc drive;
   calculating an amplitude ratio (MPP+SPP)/(MPP−SPP);
   establishing an amplitude ratio table for the predetermined phase differences and the corresponding amplitude ratios (MPP+SPP)/(MPP−SPP); and
   measuring MPP and SPP signals for a tracking error signal under test for phase difference, and calculating the amplitude ratio (MPP+SPP)/(MPP−SPP) to determine the phase difference of the tracking error signal under test according to the established phase difference amplitude ratio table.

2. The method according to claim 1, wherein the predetermined phase differences are within a range between 0 degree and 180 degrees.

3. The method according to claim 2, wherein the predetermine phase differences are 0 degree, 30 degrees, 60 degrees, 90 degrees, 120 degrees, 150 degrees and 180 degrees.

4. The method according to claim 1, wherein the predetermined phase differences are within a range between 181 degree and 360 degrees.

5. The method according to claim 1, wherein the track error signal is a differential push-pull signal.

6. The method according to claim 1, wherein a phase difference curve is adapted from the established phase difference amplitude ratio table, and the phase difference is determined according to the phase difference curve.

7. The method according to claim 1, wherein the SPP signal is amplified to a size substantially the same as the MPP signal.

* * * * *